US007215950B2

(12) United States Patent
Mazzara, Jr. et al.

(10) Patent No.: US 7,215,950 B2
(45) Date of Patent: *May 8, 2007

(54) METHOD OF TELEMATICS UNIT CONFIGURATION AND ACTIVATION USING VEHICLE CONTROL BUTTONS

(75) Inventors: William E. Mazzara, Jr., Drayton Plains, MI (US); Michael A. Hichme, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 771 days.

This patent is subject to a terminal disclaimer.

(21) Appl. No.: 10/057,855

(22) Filed: Jan. 23, 2002

(65) Prior Publication Data

US 2003/0139173 A1    Jul. 24, 2003

(51) Int. Cl.
*H04M 3/00* (2006.01)
*B60R 25/10* (2006.01)
(52) U.S. Cl. .......... 455/418; 455/569.2; 455/66.1; 455/575.9; 455/556.1; 340/426.16; 340/426.12; 340/426.14
(58) Field of Classification Search .......... 455/569.2, 455/579.9, 556.1, 418, 66.1, 74, 566, 517, 455/414, 575.9; 340/426.16, 426.14, 426.12
See application file for complete search history.

(56) References Cited

U.S. PATENT DOCUMENTS

| 5,537,673 | A | * | 7/1996 | Nagashima et al. | 455/346 |
| 5,627,547 | A | * | 5/1997 | Ramaswamy et al. | 342/357.08 |
| 5,794,164 | A | * | 8/1998 | Beckert et al. | 455/3.06 |
| 6,470,178 | B1 | * | 10/2002 | Cummings-Hill et al. | 455/186.1 |
| 6,701,161 | B1 | * | 3/2004 | Wendling | 455/556.1 |
| 2002/0069071 | A1 | * | 6/2002 | Knockeart et al. | 704/275 |
| 2002/0128000 | A1 | * | 9/2002 | do Nascimento, Jr. | 455/414 |
| 2003/0014166 | A1 | * | 1/2003 | Chinigo et al. | 701/29 |
| 2003/0096641 | A1 | * | 5/2003 | Odinak | 455/569 |
| 2003/0190030 | A1 | * | 10/2003 | Alton | 379/219 |
| 2004/0193343 | A1 | * | 9/2004 | Tan et al. | 701/36 |

* cited by examiner

*Primary Examiner*—George Eng
*Assistant Examiner*—Huy Phan
(74) *Attorney, Agent, or Firm*—Anthony Luke Simon

(57) ABSTRACT

The invention provides a method of operating a telematics unit in a mobile vehicle. A command signal may be received in response to a radio button activation, a cellular programming mode may be activated in response to the command signal, a mobile phone identification number may be received in response to a radio button activation, and an operations mode may be activated in response to the received mobile phone identification number.

20 Claims, 2 Drawing Sheets

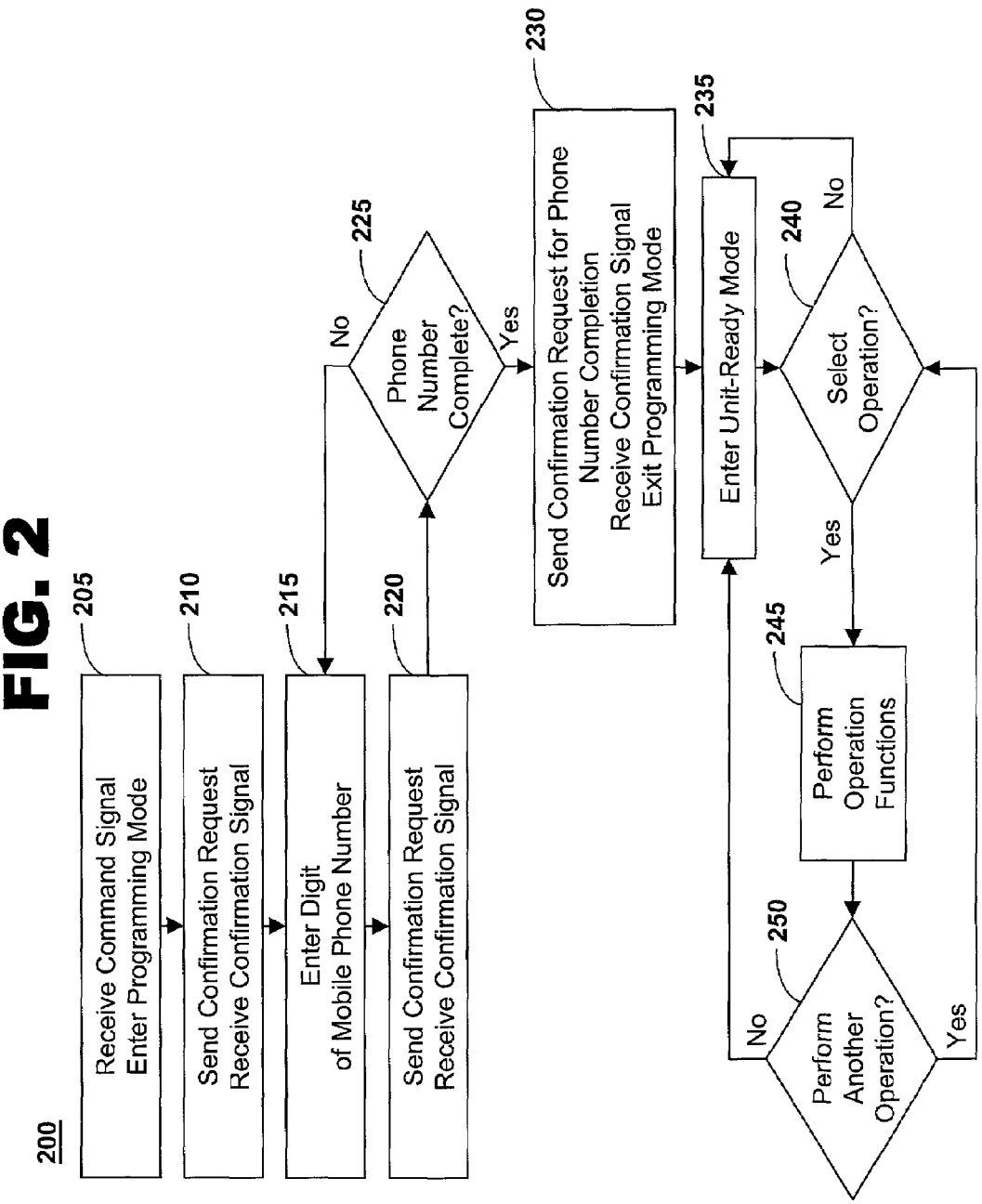

METHOD OF TELEMATICS UNIT CONFIGURATION AND ACTIVATION USING VEHICLE CONTROL BUTTONS

FIELD OF THE INVENTION

This invention relates generally to a method for programming a telematics unit using control buttons. In particular, the invention relates to configuring a telematics unit by using buttons on a control panel of a radio in a mobile vehicle.

BACKGROUND OF THE INVENTION

One of the fastest growing areas of communications technology is related to automobile network solutions. An increasing number of mobile vehicles are being equipped with wireless communication devices, requiring activation keys and new mobile-phone identification numbers, i.e. telephone numbers, to be loaded into a telematics unit of the vehicle. The process of loading a telephone number into the unit should be as efficient and uncomplicated as possible with alternative ways of setting up when preferred methods are unavailable. One preferred process utilizes over-the-air service provisioning (OTASP) specified in TIA/EIA/IS-683-A (1998), "Over-the-Air Service Provisioning of Mobile Stations in Spread Spectrum Systems." Another way may be through an air interface function (AIF) with a connection directly to a call center. However, OTASP, AIF, or other processes for activating a telematics unit are not always available or desirable.

It would be beneficial to have another process that would load a telephone number into the telematics unit from the motor vehicle without requiring any additional hardware in the motor vehicle or any communications outside the vehicle. In addition to activating the telematics unit, this process would be able to activate other operations modes within the vehicle, such as activating the mobile phone of the vehicle, initiating a phone call, adjusting vehicle parameters, or adjusting features such as temperature, seat-position or comfort settings.

Therefore, it is the object of this invention to provide a method of activating an in-vehicle telematics unit whereby a vehicle user may input a telephone number or other data into the telematics without connections outside the vehicle. The method would require no over-the-air service provisioning or air interface connections to a service call center and no additional hardware in a mobile vehicle, thereby addressing and overcoming the obstacles and needs described above.

SUMMARY OF THE INVENTION

One aspect of the invention provides a method of operating a telematics unit in a mobile vehicle. A command signal may be received in response to a radio button activation. A cellular programming mode may be activated in response to the command signal. A mobile phone identification number may be received in response to a radio button activation. An operations mode may be activated in response to the received mobile phone identification number.

The command signal may be sent in response to a depression of a predetermined radio button for a predetermined time period. The predetermined button may be an eject button.

The mobile phone identification number may be sent in response to a sequence of radio button depressions. A predetermined radio button may be depressed in combination with another predetermined radio button to provide a digit of the mobile phone identification number. A predetermined radio button may be depressed prior to the depression of another predetermined radio button to provide a digit of the mobile phone identification number.

A confirmation signal may be sent in response to receiving the command signal and activating the cellular programming mode. The confirmation signal may comprise a progression tone. The confirmation signal may comprise a digitized voice message.

The operations mode may include a confirmation mode, a call-ready mode, a call origination mode, a system identification table (SID) update mode, a preferred roaming list update mode, a unit-ready mode, or a vehicle parameter adjustment mode. A predetermined function of the operations mode may be activated in response to a radio button activation.

Another aspect of the current invention is a computer usable medium including a program to operate a telematics unit in a mobile vehicle. The program may include computer program code to receive a command signal sent in response to a radio button activation. The program may include code to activate a cellular programming mode in response to the command signal. The program may include code to receive a mobile phone identification number sent in response to a radio-button activation. The program may include code to activate an operations mode in response to the received mobile phone identification number.

The program may include code to send the command signal in response to a depression of a predetermined radio button for a predetermined time period. The program may include code to send the mobile phone identification number in response to a sequence of radio button depressions.

The program may include code to select the operations mode from a group consisting of a confirmation mode, a call-ready mode, a call origination mode, a system identification table update mode, a preferred roaming list update mode, a unit-ready mode, and a vehicle parameter adjustment mode.

The computer program code may include code to send a confirmation signal in response to receiving the command signal and activating the cellular programming mode. The computer program code may include code to activate a predetermined function of the operations mode in response to a radio button activation.

Another aspect of the current invention is a system for operating a telematics unit in a mobile vehicle. The system may include a means for receiving a command signal sent in response to a radio button activation; a means for activating a cellular programming mode in response to the command signal; a means for receiving a mobile phone identification number sent in response to a radio button activation; and a means for activating an operations mode in response to the received mobile phone identification number.

The system for operating a telematics unit may include a means for sending a confirmation signal in response to receiving the command signal and activating the cellular programming mode. The system may include a means for activating a predetermined function of the operations mode in response to a radio button activation.

The aforementioned, and other features and advantages of the invention will become further apparent from the following detailed description of the presently preferred embodiments, read in conjunction with the accompanying drawings. The detailed description and drawings are merely illustrative

BRIEF DESCRIPTION OF THE DRAWINGS

FIG. 2 is a flow diagram of one embodiment of a method to configure and activate a telematics unit in a mobile vehicle by using radio control buttons, in accordance with the current invention.

DETAILED DESCRIPTION OF THE PRESENTLY PREFERRED EMBODIMENTS

Figure 1:
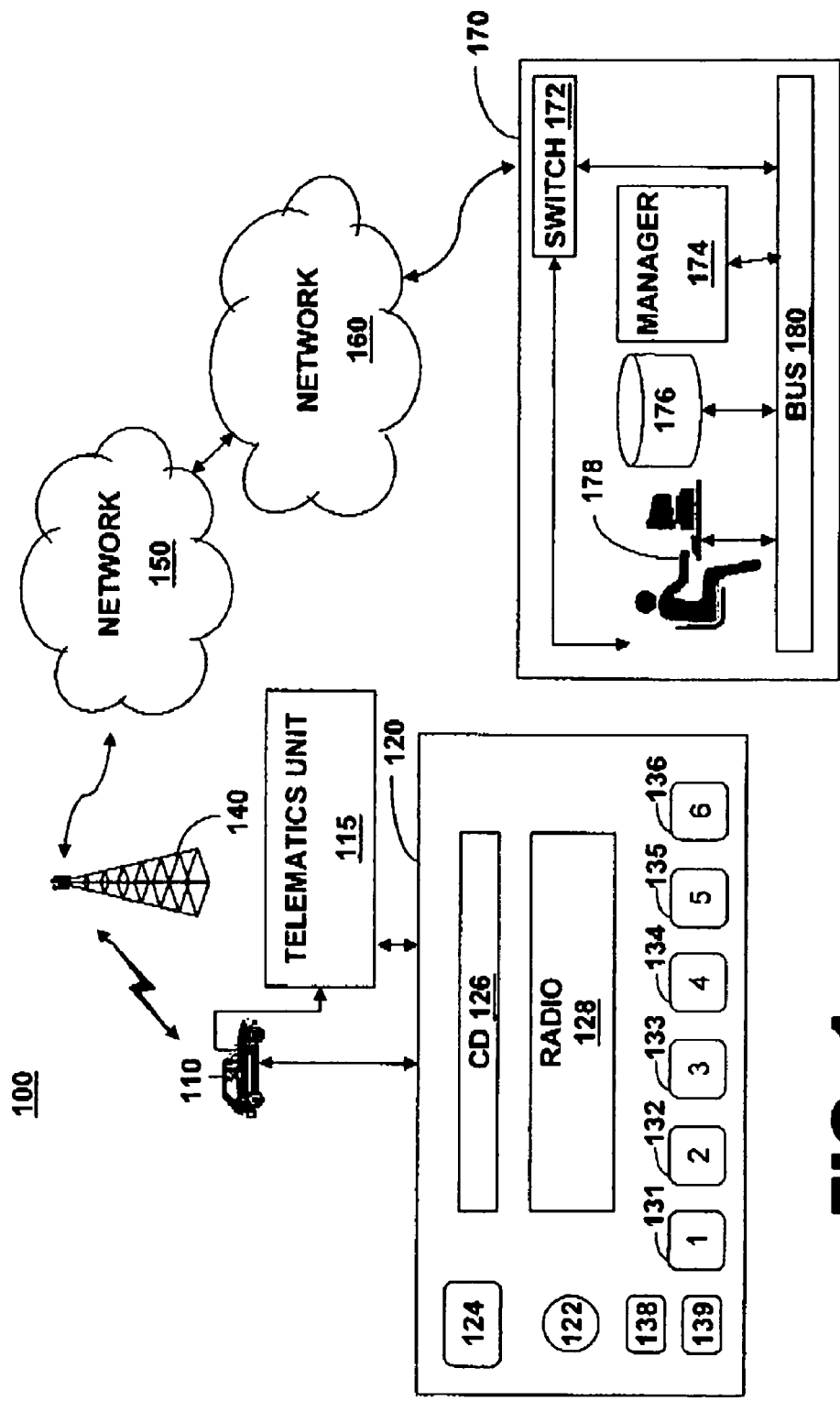
FIG. 1 is a schematic diagram of one embodiment of a system for configuring and activating a telematics unit in a mobile vehicle by using radio control buttons, in accordance with the current invention.

FIG. 1 shows one embodiment of a system for configuring and activating a telematics unit in a mobile vehicle, in accordance with the present invention at 100.

Telematics unit operational system 100 may contain a mobile vehicle 110, a telematics unit 115, an audio player and radio receiver unit 120, one or more wireless carrier systems 140, one or more communication networks 150, one or more land networks 160, and one or more call centers 170.

Audio player and radio receiver unit 120 may contain on its front radio panel a main control radio button 122 to turn the unit on and off or control volume, an eject radio button 124 to eject a compact disk from the opening slit of compact disk player (CD) 126, radio display 128, station or track selector numeric radio buttons 131, 132, 133, 134, 135, and 136, and other control radio buttons 138 and 139.

Call center 170 may contain one or more voice and data switches 172, one or more communication services managers 174, one or more communication services databases 176, one or more communication services advisors 178, and one or more bus systems 180.

Mobile vehicle 110 may be a mobile vehicle equipped with suitable hardware and software for transmitting and receiving voice and data communications. Mobile vehicle 110 may contain telematics unit 115 for sending or receiving voice or data communications. Telematics unit 115 may include, for example, a digital signal processor, a wireless modem, a global positioning system (GPS) unit, an in-vehicle memory, and a network access device (NAD). The network access device may be an analog, digital, or dual mode cellular phone. Telematics unit 115 may be a vehicle communications processor.

Mobile vehicle 110 may be a mobile vehicle equipped with an audio player and radio receiver unit 120, which may be any hardware that receives radio signals or data input from media such as compact disks, cassette tapes, digital video device, and portable computer disks. For example, audio player and radio receiver unit 120 may include CD player 126, audio tape player, clock, and an am/fm radio receiver. Audio player and radio receiver unit 120 may include various radio buttons 124, 131, 132, 133, 134, 135, 136, 138, 139 to control, for example, audio volume, balance, band selection, CD track selection, player mode, equalization of output, display lighting, clock setting, memorized channel selections, station selection, input selection, ejection of CD or tape, and other radio or player mode selections.

Telematics unit 115 may be connected by wire to audio player and radio receiver unit 120. Telematics unit 115 may receive command signals from audio player and radio receiver unit 120 when a radio button or some combination or sequence of radio buttons 124, 131, 132, 133, 134, 135, 136, 138, 139 is depressed. These signals may comprise data such as a personal identification number (PIN) or a mobile phone identification number. They may activate a programming mode of telematics unit 115, whereby a mobile phone identification number may be loaded into telematics unit 115.

Radio buttons 124, 131, 132, 133, 134, 135, 136, 138, 139 may input data to telematics unit 115, which may in turn control or change other operations modes of the mobile vehicle. These operations modes may include a confirmation mode, a call-ready mode, a call origination mode, a system identification table update mode, a preferred roaming list update mode, a unit-ready mode, and a vehicle parameter adjustment mode.

Telematics unit 115 may send signals to audio player and radio receiver unit 120 to control, for example, outputs of display or audio. Telematics unit 115 may send signals to audio player and radio receiver unit 120 to reset, for example, audio or radio button settings that were functioning before the process of activating telematics unit 115 began.

Mobile vehicle 110 via telematics unit 115 may send and receive radio transmissions from wireless carrier system 140. Wireless carrier system 140 may be any suitable system for transmitting a signal from mobile vehicle 110 to communication network 150.

Communication network 150 may comprise services from one or more mobile telephone switching offices and wireless networks. Communication network 150 may connect wireless carrier system 140 to land network 160. Communication network 150 may be any suitable system or collection of systems for connecting wireless carrier system 140 to mobile vehicle 110 and land network 160.

Land network 160 may be a public-switched telephone network. Land network 160 may be an Internet protocol (IP) network. Land network 160 may be comprised of a wired network, an optical network, a fiber network, another wireless network, or any combination thereof. Land network 160 may connect communication network 150 to call center 170. Communication network 150 and land network 160 may connect wireless carrier system 140 to a communication node or call center 170.

Call center 170 may be a location where many calls may be received and serviced at the same time, or where many calls may be sent at the same time. The call center may be a telematics call center, prescribing communications to and from telematics unit 115 in mobile vehicle 110. The call center may be a voice call center, providing verbal communications between an advisor in the call center and a subscriber in a mobile vehicle. The call center may contain each of these functions.

Call center 170 may contain one or more voice and data switches 172. Switch 172 may be connected to land network 160. Switch 172 may transmit voice or data transmissions from call center 170. Switch 172 also may receive voice or data transmissions from telematics unit 115 in mobile vehicle 110 through wireless carrier system 140 and communication network 150 and land network 160. Switch 172 may receive from or send to one or more communication services managers 174 data transmissions via one or more bus systems 180. Communication services manager 174 may be any suitable hardware and software capable of providing requested communication services to telematics unit 115 in mobile vehicle 110. Communication services manager 174 may send to or receive from one or more communication services databases 176 data transmissions via bus system 180. Communication services manager 174 may send to or receive from one or more communication services advisors 178 data transmissions via bus system 180. Communication services database 176 may send to or receive from communication services advisor 178 data transmissions via bus system 180. Communication services advisor 178 may receive from or send to switch 172 voice or data transmissions.

Communication services manager 174 may provide one or more of a variety of services, including enrollment services, navigation assistance, directory assistance, roadside assistance, business or residential assistance, information services assistance, emergency assistance, and communications assistance. Communication services manager 174 may transmit data to telematics unit 115 in mobile vehicle 110 through wireless carrier system 140, communication network 150, land network 160, voice and data switch 172, and bus system 180. Communication services manager 174 may store or retrieve data and information from communication services database 176. Communication services manager 174 may provide requested information to communication services advisor 178.

Communication services advisor 178 may be a real advisor or a virtual advisor. A real advisor may be a human being in verbal communication with a user or subscriber in mobile vehicle 110 via telematics unit 115. A virtual advisor may be a synthesized voice interface responding to requests from telematics unit 115 in mobile vehicle 110. Communication services advisor 178 may provide services to telematics unit 115 in mobile vehicle 110. Services provided by communication services advisor 178 may include enrollment services, navigation assistance, directory assistance, roadside assistance, business or residential assistance, information services assistance, emergency assistance, and communications assistance. Communication services advisor 178 may communicate with telematics unit 115 in mobile vehicle 110 through wireless carrier system 140, communication network 150, and land network 160 using voice transmissions, or through communication services manager 174 and switch 172 using data transmissions. Switch 172 may select between voice transmissions and data transmissions.

Telematics unit 115 in mobile vehicle 110 may initiate, for example, a communication services request to call center 170 via wireless carrier system 140, communication network 150, and land network 160. Telematics unit 115 in mobile vehicle 110 may initiate, for example, communications with wireless carrier system 140 in the same geographical region as the mobile vehicle.

FIG. 2 shows a flow diagram of one embodiment of a method to configure and activate a telematics unit system in a mobile vehicle, in accordance with the present invention at 200. In this telematics unit operational method 200, radio buttons 124, 131, 132, 133, 134, 135, 136, 138, 139 of audio player and radio receiver unit 120 are used alone or in various combinations or sequences to send signals to request the activation of telematics unit 115.

Telematics unit 115 in a mobile vehicle may have software defaults set and certain features enabled by the telematics unit manufacturer or retailer before the vehicle delivered to a new user. Telematics unit 115 may be activated at a later time by a vehicle user desiring to receive services from a vehicle communications service provider or a telematics service call center.

The manufacturer or vendor may record the vehicle identification number (VIN), the station identification number (STID) of the vehicle communication processor or unit, the electronic serial number (ESN) of the network access device (NAD), and an authentication key for the vendor, which all may be used to identify the vehicle and telematics unit during the enrollment process with a wireless service provider or call center.

The manufacturer, vendor, dealer or wireless service provider may give the new automobile owner a mobile phone identification number, i.e. a dialable phone number, or mobile directory number (MDN) that may be used to activate telematics unit 115. The telephone number may be, for example, a generic default mobile station identifier (MSID), which may be a non-portable and non-dialable 10-digit mobile phone identification number (MIN), or a 15-digit international mobile station identifier (IMSI) that is used within land network 160. The telephone number may be, for example, a clear, non-validating phone number. The telephone number may be for example, in the format of 111-222-1234, which is typical of phone numbers in the United States.

Telematics unit 115 may be activated by depressing predetermined radio button or buttons 124, 131, 132, 133, 134, 135, 136, 138, 139 of audio player and radio receiver unit 120. Telematics unit 115 may receive a command signal from standard audio player and radio receiver unit 120 when one or more predetermined radio buttons 124, 131, 132, 133, 134, 135, 136, 138, 139 on the head unit or front panel are depressed, and may enter a cellular programming mode, (Block 205). For example, the request to enter the programming mode may be sent with the depression of eject radio button 124 for ten seconds. The request to enter the cellular programming mode may be sent with the depression of other predetermined buttons and combinations of buttons for a predetermined length of time. For example, the request to enter the programming mode may be sent with the depression of eject radio button 124 in conjunction with the depression of button 138 for ten seconds. For example, the request to enter the programming mode may be sent with the sequence of depressing eject radio button 124, radio button 138 and radio button 139.

Telematics unit 115 may send a request to audio player and radio receiver unit 120 to confirm that telematics unit 115 should be in the cellular programming mode, (Block 210). The confirmation request or confirmation signal may be a visual or aural alert signal. The confirmation signal may comprise, for example, a single tone, a progression tone or a digitized voice message. A progression tone may be, for example, a series of differently pitched sounds. In return, audio player and radio receiver unit 120 may send back a confirmation acknowledgement to telematics unit 115 in response to a predetermined radio button activation or depression.

Telematics unit 115 may require a mobile phone identification number to be activated. This number may include, for example, a dialable phone number, a mobile directory number (MDN), a generic default mobile station identifier (MSID), a 10-digit mobile phone identification number (MIN), 15-digit international mobile station identifier (IMSI), or a clear, non-validating phone number.

Mobile vehicle user may enter a digit of a mobile phone number via depressions of station or track selector numeric radio buttons 131, 132, 133, 134, 135, 136, (Block 215). A listing of alphanumeric characters with respective predetermined buttons and combinations of buttons may be given to the user through written, radio display, or digitized voice instructions. One example of a mapping algorithm of button combinations and characters is included in Table 1 below.

TABLE 1

| Radio Button Name | Alphanumeric Character Represented |
|---|---|
| Radio Station 1 | 1 |
| Radio Station 2 | 2 |
| Radio Station 3 | 3 |
| Radio Station 4 | 4 |
| Radio Station 5 | 5 |
| Radio Station 6 | 6 |
| Eject Button + Radio Station 1 | 0 |
| Eject Button + Radio Station 2 | 7 |
| Eject Button + Radio Station 3 | 8 |
| Eject Button + Radio Station 4 | 9 |
| Eject Button + Radio Station 5 | * |
| Eject Button + Radio Station 6 | # |

In this example, eject radio button 124 may act like a shift key of a typical computer keyboard to allow two characters to be represented by one radio button. In cases where there may be fewer than six station or track selector buttons, a second button may act as another shift key. In the example where audio player and radio receiver unit 120 has four station or track selector numeric radio buttons 131, 132, 133, 134, a set of predetermined button combinations and alphanumeric characters may be represented as in Table 2.

TABLE 2

| Radio Button Name | Alphanumeric Character Represented |
|---|---|
| Radio Station 1 | 1 |
| Radio Station 2 | 2 |
| Radio Station 3 | 3 |
| Radio Station 4 | 4 |
| Button 138 + Radio Station 1 | 5 |
| Button 138 + Radio Station 2 | 6 |
| Button 138 + Radio Station 3 | 7 |
| Button 138 + Radio Station 4 | 8 |
| Button 139 + Radio Station 1 | 9 |
| Button 139 + Radio Station 2 | 0 |
| Button 139 + Radio Station 3 | * |
| Button 139 + Radio Station 4 | # |

The manner and sequence in which buttons are depressed may be determined by the mapping of button depressions to specific signals or alphanumeric characters from the manufacturer of telematics unit 115, manufacturer of mobile vehicle 110, or designers of software applications used by telematics unit 115. Radio buttons may be depressed at the same time, one after another with both held, or in sequence to provide a digit in the mobile phone identification number.

In another example of a mapping algorithm, eject button 124 may be depressed for ten seconds to enter a numerical and character mode where main control radio button 122 may be twisted to the right or left to run through a list of alphanumeric characters that are displayed on radio display 128. When the mobile vehicle user locates the digit needed for input to telematics unit 115, radio button 138 may be depressed to send to telematics unit 115 the signal representing the chosen digit. After each entry of a digit with whatever predetermined mapping algorithm has been used, telematics unit 115 may send a confirmation signal to audio player and radio receiver unit 120, which may send back a confirmation acknowledgement to telematics unit 115 in response to a predetermined radio button activation or depression, (Block 220). The confirmation signal may comprise, for example, a single tone, a progression tone or a digitized voice message.

When telematics unit 115 has received a sufficient number of digits to constitute a complete telephone number, it may query the mobile vehicle user if the phone number is complete. The telephone number may or may not be complete, (Block 225). When it is not complete, the process of entering more digits continues, (Block 215).

When the phone number has been entered completely, telematics unit 115 may send a confirmation signal to audio player and radio receiver unit 120, which may send back a confirmation acknowledgement to telematics unit 115 in response to a predetermined radio button activation or depression by the mobile vehicle user, (Block 230). The confirmation signal may comprise, for example, a single tone, a progression tone or a digitized voice message. At this point, telematics unit 115 may exit its cellular programming mode and then enter a unit-ready mode, waiting for a possible signal request for entering other operational modes, (Block 235). The unit-ready mode may serve as a wait or idle mode.

Telematics unit 115 may be ready for receiving operation requests via signals sent from a radio button or a combination of radio buttons. The operations mode may be fundamental parameters required for cellular operation such as a mobile phone registration with a wireless carrier or telematics service call center. The operations mode may be, for example, a call-ready mode, a call-origination mode, a system identification table update mode, a preferred roaming list update mode, a unit-ready mode, or a vehicle parameter adjustment mode. The operations modes may include controls for adjusting comfort settings such as seat position, mirror position, or default temperature limits.

The mobile vehicle user may select from a menu one of the operations that may be listed via written instruction, radio display, or digitized voice messages. Selections may be indicated by signals sent with a depression of one or more radio buttons. Which buttons are depressed may be determined by the mapping of button depressions similar to the mappings examples given. One example of mapping a button depression to a requested operations mode may be given in Table 3.

TABLE 3

| Radio Button Name | Operations Mode Requested |
|---|---|
| Radio Button 1 | call-ready mode |
| Radio Button 2 | call-origination mode |
| Radio Button 3 | system identification table update mode |
| Radio Button 4 | preferred roaming list update mode |
| Radio Button 5 | vehicle parameter adjustment mode |
| Radio Button 6 | unit-ready mode |

An operation may or may not be selected, (Block 240). When no operation is selected, telematics unit 115 may remain in a unit-ready operation mode, keeping the unit on ready status, (Block 235).

When an operation is selected, i.e. the mobile vehicle user may send a operation service request via the depression of one or more radio buttons in a predetermined combination or sequence, and telematics unit 115 may perform the functions of the requested operation, (Block 245). Alternatively, telematics unit 115 may send a request for a radio button entry to the mobile vehicle user via audio player and radio receiver unit 120.

The mobile vehicle user may or may not want telematics unit 115 to perform another operation, (Block 250). When another operation is desired, the additional operation may be selected, for example, by input from a radio button, (Block 240). When another operation is not desired, telematics unit 115 may return to its unit-ready mode, (Block 235).

While the embodiments of the invention disclosed herein are presently preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A method of operating a telematics unit in a mobile vehicle, comprising:
   receiving a command signal sent in response to a radio button activation;
   activating a cellular programming mode in response to the command signal;
   receiving a mobile phone identification number sent in response to a radio button activation; and
   activating an operations mode in response to the received mobile phone identification number.

2. The method of claim 1 wherein the command signal is sent in response to a depression of a predetermined radio button for a predetermined time period.

3. The method of claim 2 wherein the predetermined button is an eject button.

4. The method of claim 1 wherein the mobile phone identification number is sent in response to a sequence of radio button depressions.

5. The method of claim 4 wherein a predetermined radio button is depressed in combination with another predetermined radio button to provide a digit of the mobile phone identification number.

6. The method of claim 4 wherein a predetermined radio button is depressed prior to the depression of another predetermined radio button to provide a digit of the mobile phone identification number.

7. The method of claim 1 further comprising:
   sending a confirmation signal in response to receiving the command signal and activating the cellular programming mode.

8. The method of claim 7 wherein the confirmation signal comprises a progression tone.

9. The method of claim 7 wherein the confirmation signal comprises a digitized voice message.

10. The method of claim 1 wherein the operations mode is selected from a group consisting of a confirmation mode, a call-ready mode, a call-origination mode, a system identification table update mode, a preferred roaming list update mode, a unit-ready mode, and a vehicle parameter adjustment mode.

11. The method of claim 1 further comprising:
    activating a predetermined function of the operations mode in response to a radio button activation.

12. A computer usable medium including a program for operating a telematics unit in a mobile vehicle comprising:
    computer program code to receive a command signal sent in response to a radio button activation;
    computer program code to activate a cellular programming mode in response to the command signal;
    computer program code to receive a mobile phone identification number sent in response to a radio button activation; and
    computer program code to activate an operations mode in response to the received mobile phone identification number.

13. The computer usable medium of claim 12 wherein the command signal is sent in response to a depression of a predetermined radio button for a predetermined time period.

14. The computer usable medium of claim 12 wherein the mobile phone identification number is sent in response to a sequence of radio button depressions.

15. The computer usable medium of claim 12 wherein the operations mode is selected from a group consisting of a confirmation mode, a call-ready mode, a call origination mode, a system identification table update mode, a preferred roaming list update mode, a unit-ready mode, and a vehicle parameter adjustment mode.

16. The computer usable medium of claim 12 further comprising:
    computer program code to send a confirmation signal in response to receiving the command signal and activating the cellular programming mode.

17. The computer usable medium of claim 12 further comprising:
    computer program code to activate a predetermined function of the operations mode in response to a radio button activation.

18. A system for operating a telematics unit in a mobile vehicle comprising:
    means for receiving a command signal sent in response to a radio button activation;
    means for activating a cellular programming mode in response to the command signal;
    means for receiving a mobile phone identification number sent in response to a radio button activation; and
    means for activating an operations mode in response to the received mobile phone identification number.

19. The system of claim 18 further comprising:
    means for sending a confirmation signal in response to receiving the command signal and activating the cellular programming mode.

20. The system of claim 18 further comprising:
    means for activating a predetermined function of the operations mode in response to a radio button activation.

* * * * *